(12) United States Patent
Oreggia et al.

(10) Patent No.: US 12,056,080 B2
(45) Date of Patent: Aug. 6, 2024

(54) HIGH SPEED DATA TRANSMISSION IN BATTERY MANAGEMENT SYSTEMS WITH ISOLATED SPI INTERFACE

(71) Applicant: STMicroelectronics S.r.l., Agrate Brianza (IT)

(72) Inventors: Daniele Oreggia, Milan (IT); Alessandro Cannone, Marsala (IT); Diego Alagna, Milan (IT); Marcello Raimondi, Tortona (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 140 days.

(21) Appl. No.: 17/732,114

(22) Filed: Apr. 28, 2022

(65) Prior Publication Data

US 2023/0350840 A1 Nov. 2, 2023

(51) Int. Cl.
*G06F 13/42* (2006.01)
*G06F 13/364* (2006.01)
*G06F 13/40* (2006.01)

(52) U.S. Cl.
CPC ........ *G06F 13/4291* (2013.01); *G06F 13/364* (2013.01); *G06F 13/4022* (2013.01)

(58) Field of Classification Search
CPC ............... G06F 13/4291; G06F 13/364; G06F 13/4022; G06F 13/385; G06F 13/4045; G06F 13/4072; G06F 13/4247; G06F 13/4282; H01M 2010/4271; H01M 2010/4278; H04L 2012/40273; H04L 12/40032; H04L 12/40169
See application file for complete search history.

(56) References Cited

U.S. PATENT DOCUMENTS 5,886,658 A * 3/1999 Amar ........................ G06F 3/05
710/5
9,592,738 B1 * 3/2017 Paryani ................. G06F 13/404
(Continued)

FOREIGN PATENT DOCUMENTS

WO     2022072123 A1    4/2022

OTHER PUBLICATIONS

Stmicroelectronics, "Automotive general purpose SPI to isolated SPI transceiver," L9963T, Datasheet, Revision 1, XP093072559, Jan. 2021, 47 pages.

*Primary Examiner* — Faisal M Zaman
(74) *Attorney, Agent, or Firm* — Slater Matsil, LLP

(57) ABSTRACT

A battery management system includes: a controller; a master battery management integrated circuit (BMIC) device coupled to the controller and configured to communicate with the controller through a standard Serial Peripheral Interface (SPI) protocol; and a first slave BMIC device and a second slave BMIC device that are connected in a daisy chain configuration and communicating through Isolated SPI interfaces, where the first slave BMIC device is coupled to the master BMIC through an Isolated SPI interface, where the Isolated SPI interface uses a differential signal comprising a positive signal and a complementary negative signal, where a bit frame of the positive signal includes a bit period followed by an idle period having a same duration as the bit period, where the first slave BMIC device and the second slave BMIC device are configured to be coupled to a first battery pack and a second battery pack, respectively.

19 Claims, 14 Drawing Sheets

(56) References Cited

U.S. PATENT DOCUMENTS

| | | | |
|---|---|---|---|
| 11,476,676 B1* | 10/2022 | Lohe | B60L 58/21 |
| 11,542,148 B2* | 1/2023 | Jackson | B67D 1/0895 |
| 2012/0275527 A1* | 11/2012 | Douglass | H04L 25/0272 |
| | | | 375/257 |
| 2018/0037134 A1 | 2/2018 | Weicker | |
| 2019/0097837 A1* | 3/2019 | Heiling | H04L 12/40039 |
| 2021/0143774 A1* | 5/2021 | Cummings | H01M 10/44 |
| 2022/0253398 A1* | 8/2022 | Hyakudai | H04L 5/14 |
| 2023/0042164 A1* | 2/2023 | Xhafa | H02J 7/0048 |
| 2023/0261331 A1* | 8/2023 | Morton | H01M 50/271 |
| | | | 429/163 |

* cited by examiner

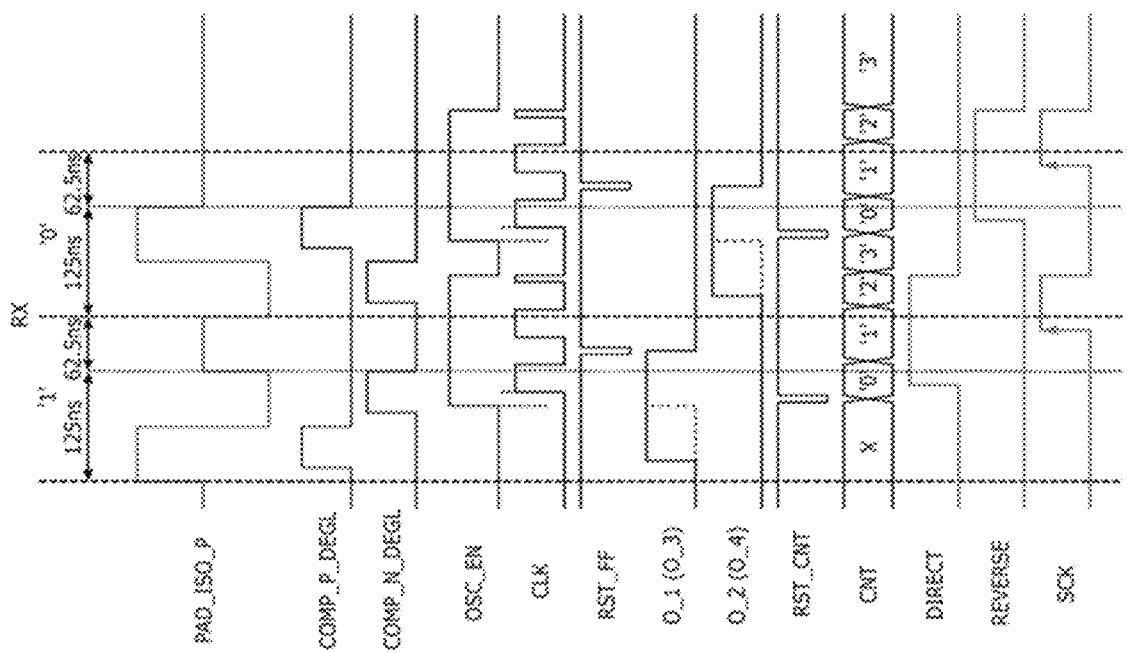

| FIELD | DESCRIPTION | WIDTH |
|---|---|---|
| PA | 0: Answer sent by any Slave Unit<br>1: Command sent by Master Unit | 1 bit |
| BURST | 0: Answer with classic frame<br>1: Answer with long frame | 1 bit |
| DEV ID | It identifies the x-th device in a daisy chain | 6 bits |
| CELLS ENABLED | It identifies bit-a-bit which cells are enabled | 18 bits |
| TEMP ENABLED | It identifies bit-a-bit which temperature sensors are enabled | 9 bits |
| DELTA N BITS | It identifies how many bits are needed for delta voltage (cell[x] voltage – min value) | 4 bits |
| MIN VALUE | It identifies the minimum voltage among cells | 16 bits |
| DELTA 1 - DELTA 18 | Delta value for each enabled cell (up to 18 cells) | Each DELTA_x field has (DELTA_N_BITS + 1) bits |
| SUMS | Sum values (3 sum values) | Each sum value has 16 bits |
| TEMPERATURES | Temperature values for enabled sensors (up to 9) | Each temperature value has 12 bits |
| CRC | Cyclic Redundancy Check with Hamming Distance of 3 | 10 bits |

Fig. 7

HIGH SPEED DATA TRANSMISSION IN BATTERY MANAGEMENT SYSTEMS WITH ISOLATED SPI INTERFACE

TECHNICAL FIELD

The present invention relates generally to battery management systems (BMSs) and battery management integrated circuit (BMIC) devices.

BACKGROUND

Battery packs are used in a wide variety of electrical systems and applications, such as full electric (FE) vehicles, hybrid electric (HE) vehicles, backup energy storage systems, uninterruptible power supply (UPS) units, e-bikes, e-scooters, portable and semi-portable equipment. The evolving technology of the electrical systems makes improved performance of battery management systems (BMSs) a desirable feature in order to facilitate safe, reliable and cost-efficient battery operation.

Battery management integrated circuit (BMIC) devices are used in battery management system. For example, in FE vehicle or hybrid electric vehicle applications, to manage all battery packs installed in the vehicle, a lot of BMIC devices are used in the battery management system. Each battery pack is coupled to a BMIC device, which BMIC device manages the battery cells in the battery back. One of the tasks of the BMIC is to perform very precise cell voltage measurements and communicate the measurements to a micro-controller (MCU) of the battery management system as quickly as possible, in order to maintain all cells voltages as close as possible to increase battery performance.

As the number of battery packs used in the electrical vehicles increases, communicating the measurements from all of the battery packs to the MCU in a timely manner may become a challenge. There is a need in the art for BMIC devices that support high speed data communication between the MCU and the BMIC devices.

SUMMARY

In some embodiments, an integrated circuit (IC) device includes: a first plurality of input/output (I/O) pins; a first interface circuit coupled to the first plurality of I/O pins, wherein the first interface circuit comprises a first decoding circuit and a first format converter; a second plurality of I/O pins; a second interface circuit coupled to the second plurality of I/O pins, wherein the second interface circuit comprises a second decoding circuit and a second format converter; a first data bus coupled between outputs of the first decoding circuit and inputs of the second format converter; a second data bus coupled between outputs of the second decoding circuit and inputs of the first format converter; and a digital control circuit coupled to the first data bus and the second data bus, wherein each of the first decoding circuit and the second decoding circuit is configured to decode an Isolated Serial Peripheral Interface (SPI) signal into a three-pin signal, wherein the Isolated SPI signal is a differential signal comprising a positive signal and a complementary negative signal, wherein a bit frame of the positive signal includes a bit period and an idle period that have a same duration, wherein the three-pin signal includes a first data signal, a second data signal, and a synchronization signal, wherein each of the first format converter and the second format converter is configured to convert the three-pin signal into the Isolated SPI signal.

In some embodiments, a battery management system includes: a controller; a master battery management integrated circuit (BMIC) device coupled to the controller and configured to communicate with the controller through a standard Serial Peripheral Interface (SPI) protocol; a first slave BMIC device, wherein a first Isolated SPI interface of the first slave BMIC device is coupled to an Isolated SPI interface of the master BMIC through galvanic isolation, wherein the first slave BMIC device is configured to be coupled to a first battery pack, wherein the Isolated SPI interface is a two-pin communication interface using a differential signal comprising a positive signal and a complementary negative signal, wherein a bit frame of the positive signal includes a bit period followed by an idle period that has a same duration as the bit period; and a second slave BMIC device, wherein a first Isolated SPI interface of the second slave BMIC device is coupled to a second Isolated SPI interface of the first slave BMIC device through galvanic isolation, wherein the second slave BMIC device is configured to be coupled to a second battery pack.

In some embodiments, a battery system includes: a battery pack comprising a plurality of battery cells; and a battery management integrated circuit (BMIC) device coupled to the batter pack, the BMIC device comprising: a first plurality of input/output (I/O) pins; a first interface circuit coupled to the first plurality of I/O pins, wherein the first interface circuit comprises a first decoding circuit and a first format converter; a second plurality of I/O pins; a second interface circuit coupled to the second plurality of I/O pins, wherein the second interface circuit comprises a second decoding circuit and a second format converter; a first data bus coupled between outputs of the first decoding circuit and inputs of the second format converter; a second data bus coupled between outputs of the second decoding circuit and inputs of the first format converter; a digital control circuit coupled to the first data bus and the second data bus; and analog-to-digital converters (ADCs) coupled between the digital control circuit and the battery pack, wherein each of the first decoding circuit and the second decoding circuit is configured to decode an Isolated Serial Peripheral Interface (SPI) signal into a three-pin signal, wherein the Isolated SPI signal is a differential signal comprising a positive signal and a complementary negative signal, wherein a bit frame of the positive signal includes a bit period and an idle period that have a same duration, wherein the three-pin signal includes a first data signal, a second data signal, and a synchronization signal, wherein each of the first format converter and the second format converter is configured to convert the three-pin signal into the Isolated SPI signal.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be re-described in the interest of brevity. For a more complete understanding of the invention, reference is now made to the following descriptions taken in conjunction with the accompanying drawings, in which:

FIG. 5E illustrates a timing diagram for the decoding circuit of FIGS. 5A-5C, in another embodiment;

FIG. 7 illustrates a frame structure for burst mode data transmission, in an embodiment.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely battery management integrated circuits (BMICs) and battery management systems (BMSs).

Figure 1:
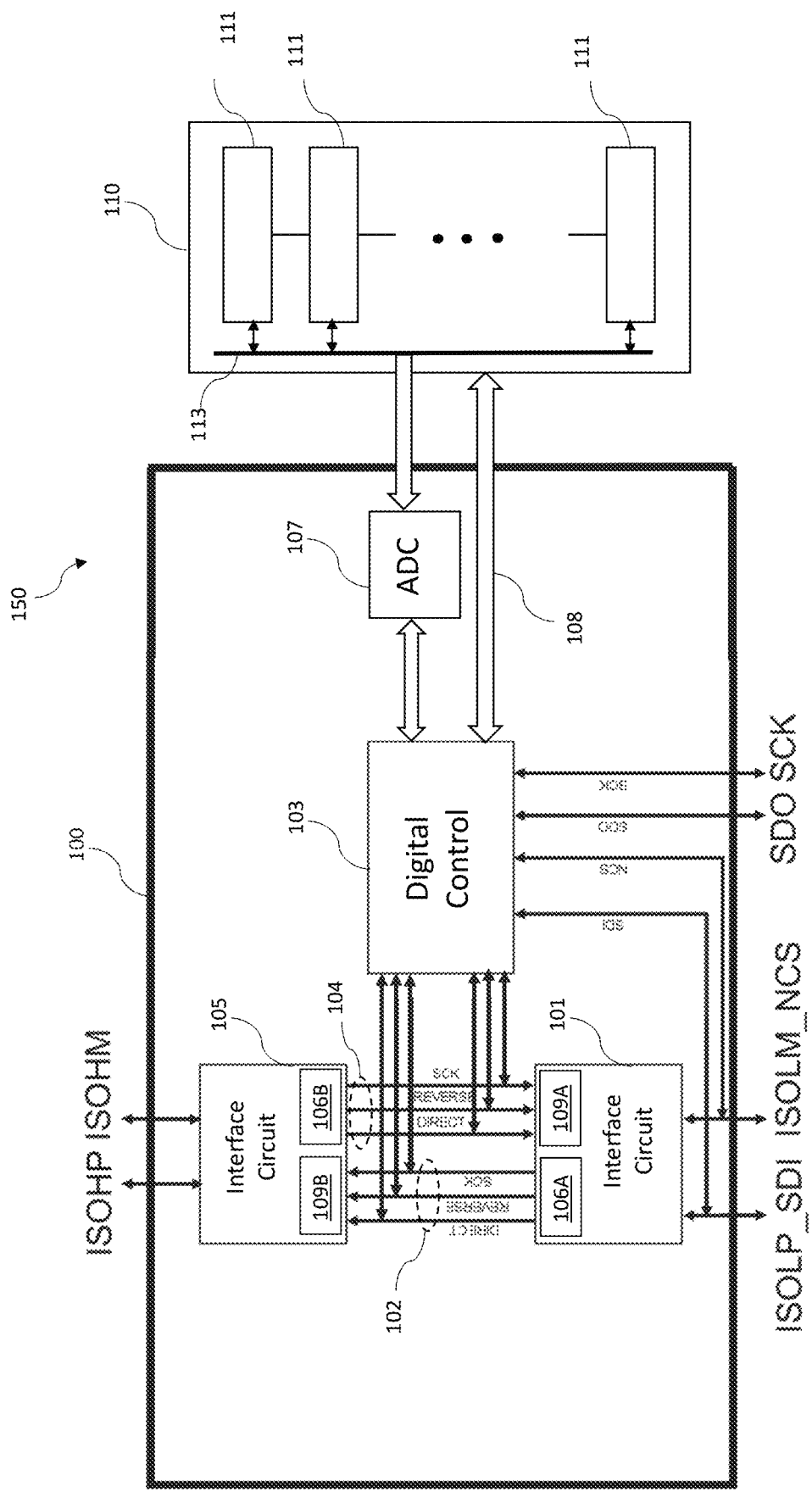
FIG. 1 illustrates a block diagram of a battery system including a battery management integrated circuit (BMIC) and a battery pack, in an embodiment.

FIG. 1 illustrates a block diagram of a battery system 150 that includes a battery management integrated circuit (BMIC) 100 (may also be referred to as a BMIC device) and a battery pack no, in an embodiment. The battery pack 110 is coupled to the BMIC 100 and is managed by the BMIC 100. In some embodiments, the BMIC 100 is installed (e.g., bonded) on the printed circuit board (PCB) board of the battery pack 110.

As illustrated in FIG. 1, the battery pack no (may also be referred to as a battery no for simplicity) includes a plurality of battery cells in (may also be referred to as cells in for simplicity). The battery cells in may be coupled in series and/or in parallel to provide a desired supply voltage and/or supply current of the battery pack no. The number of battery cells in may vary from, e.g., a few cells to tens of (e.g., about 20) cells. FIG. 1 further illustrates a bus 113 in the battery pack no. The bus 113 couples the battery cells in to the analog-to-digital converters (ADCs) of the BMIC 100.

As illustrated in FIG. 1, the BMIC 100 includes a first interface circuit 101, a second interface circuit 105, a digital control circuit 103, and a plurality of analog-to-digital converters (ADCs) 107. In the block diagram of FIG. 1, the plurality of ADCs 107 are illustrated as one block, with the understanding that multiple ADCs 107 are included in the BMIC 100. Note that for simplicity, no all features of the BMIC 100 are illustrated in FIG. 1. The BMIC 100 is used as a transceiver device to transmit and receive a serial data stream in a half-duplex mode, in some embodiments. In addition, the BMIC 100 may be used as an interface device to connect a device with an SPI interface (may also be referred to as a standard SPI interface to distinguish from the Isolated SPI interface discussed herein) to another device with an Isolated SPI interface, in some embodiments. The SPI interface is an industry standard interface that communicates with a four-line data bus labeled as, e.g., SDI, SDO, NCS, SCK. The Isolated SPI interface described herein is a custom interface that communicates with a two-line data bus (e.g., for carrying a differential signal). The BMIC 100 may be set to work in a master mode or a slave mode. Details are discussed hereinafter.

In FIG. 1, the first interface circuit 101 includes a decoding circuit 106A and a format converter 109A. The second interface circuit 105 includes a decoding circuit 106B and a format converter 109B. The decoding circuit 106A in the first interface circuit 101 is the same as the decoding circuit 106B in the second interface circuit 105, and may be collectively referred to as decoding circuits 106, in some embodiments. The format converters 109A in the first interface circuit 101 is the same as the format converter 109B in the second interface circuit 105, and may be collectively referred to as format converters 109, in some embodiments. As illustrated in FIG. 1, a first data bus 102, which has three signal lines labeled as DIRECT, REVERSE, and SCK in FIG. 1, is coupled between the output terminals of the decoding circuit 106A and the input terminals of the format converter 109B. A second data bus 104, which also has three signal lines labeled as DIRECT, REVERSE, and SCK in FIG. 1, is coupled between the output terminals of the decoding circuit 106B and the input terminals of the format converter 109A.

The decoding circuit 106A is configured to receive an Isolated SPI signal from two input/output (I/O) pins of the BMIC 100 labeled as ISOLP_SDI and ISOLM_NCS in FIG. 1, and is configured to decode the received Isolated SPI signal into a three-pin signal (e.g., a signal transmitted on three signal lines), which three-pin signal is sent through the first data bus 102 to the format converter 109B. The Isolated SPI signal is a differential signal that includes a positive signal and a complementary negative signal for transmitting a serial data stream. Details of the Isolated SPI signal are described hereinafter with reference to FIG. 3. Details of the three-pin signal are described hereinafter with reference to FIG. 4D. Various embodiments of the decoding circuit 106 are discussed hereinafter with reference to FIGS. 4A-4C and FIGS. 5A-5C. The format converter 109B converts the three-pin signal received from the first data bus 102 back into the Isolated SPI signal, and sends the converted Isolated SPI signal to the I/O pins of the BMIC 100 labeled as ISOHP and ISOHM in FIG. 1.

Similarly, the decoding circuit 106B is configured to receive an Isolated SPI signal from the I/O pins of the BMIC 100 labeled as ISOHP and ISOHM in FIG. 1, and is configured to decode the received Isolated SPI signal into the three-pin signal, which three-pin signal is sent through the second data bus 104 to the format converter 109A. The format converter 109A converts the three-pin signal received from the second data bus 104 back into the Isolated SPI signal, and sends the converted Isolated SPI signal to the I/O pins of the BMIC 100 labeled as ISOLP_SDI and ISOLM_NCS in FIG. 1.

The digital control circuit 103 is coupled to the first data bus 102 and the second data bus 104. The digital control circuit 103 may be or include a processor, a digital logic, combinations thereof, or the like. The digital control circuit 103 converts the three-pin signal transmitted on the first data bus 102 or the second data bus 104 into a serial data stream (e.g., a one-bit data stream) for processing by the digital control circuit 103. In addition, the digital control circuit 103 can also convert a serial data stream generated (or received)

by the digital control circuit 103 into the three-pin signal for transmission on the first data bus 102 or the second data bus 104. In other words, the digital control circuit 103 can translate between the three-pin signal and a serial data stream.

Still referring to FIG. 1, the digital control circuit 103 is also coupled to the I/O pins labeled as ISOLP_SDI, ISOLM_NCS, SDO, and SCK. When the BMIC 100 works in master mode and when a standard SPI signal (which may include four signal lines such as SDI, NCS, SDO, and SCK) is applied at the I/O pins labeled as ISOLP_SDI, ISOLM_NCS, SDO, and SCK, the digital control circuit 103 converts the standard SPI signal into the three-pin signal for transmission on, e.g., the first data bus 102. Conversely, when a three-pin signal is received by the digital control circuit 103, the digital control circuit 103 can convert the three-pin signal into the standard SPI signal and output the standard SPI signal at the I/O pins labeled as ISOLP_SDI, ISOLM_NCS, SDO, and SCK. When the BMIC 100 works in slave mode, the I/O pins ISOLP_SDI and ISOLM_NCS are used as the I/O pins of an Isolated SPI interfaces of the BMIC 100 to transmit/receive a differential signal. The I/O pins ISOHP and ISOHM of the BMIC 100 are used as the I/O pins of another Isolated SPI interface of the BMIC 100.

In the example of FIG. 1, the BMIC 100 further includes a plurality of ADCs 107. Each of the battery cells 11 is coupled to a respective ADC 107, such that all of the battery cells 11 can be measured at the same time (e.g., simultaneously), in some embodiments. The BMIC 100 may also have a control path 108 for controlling the operation of the battery pack 110. In some embodiments, the BMIC 100 may control the internal switches/control circuits of the battery pack 110, such that the battery cells 111 are coupled to respective ADCs 107 through the bus 113, such that the voltage of each individual battery cell 111 is converted into digital data by a respective ADC 107. Although not shown, the battery pack 110 may include other sensors for measuring other characteristics of the battery pack 110, such as temperature sensors for measuring the temperature at different locations within the battery pack 110. These sensors may also be coupled to the bus 113 such that the sensor outputs can be converted by the ADCs 107 into digital data.

Figure 2:
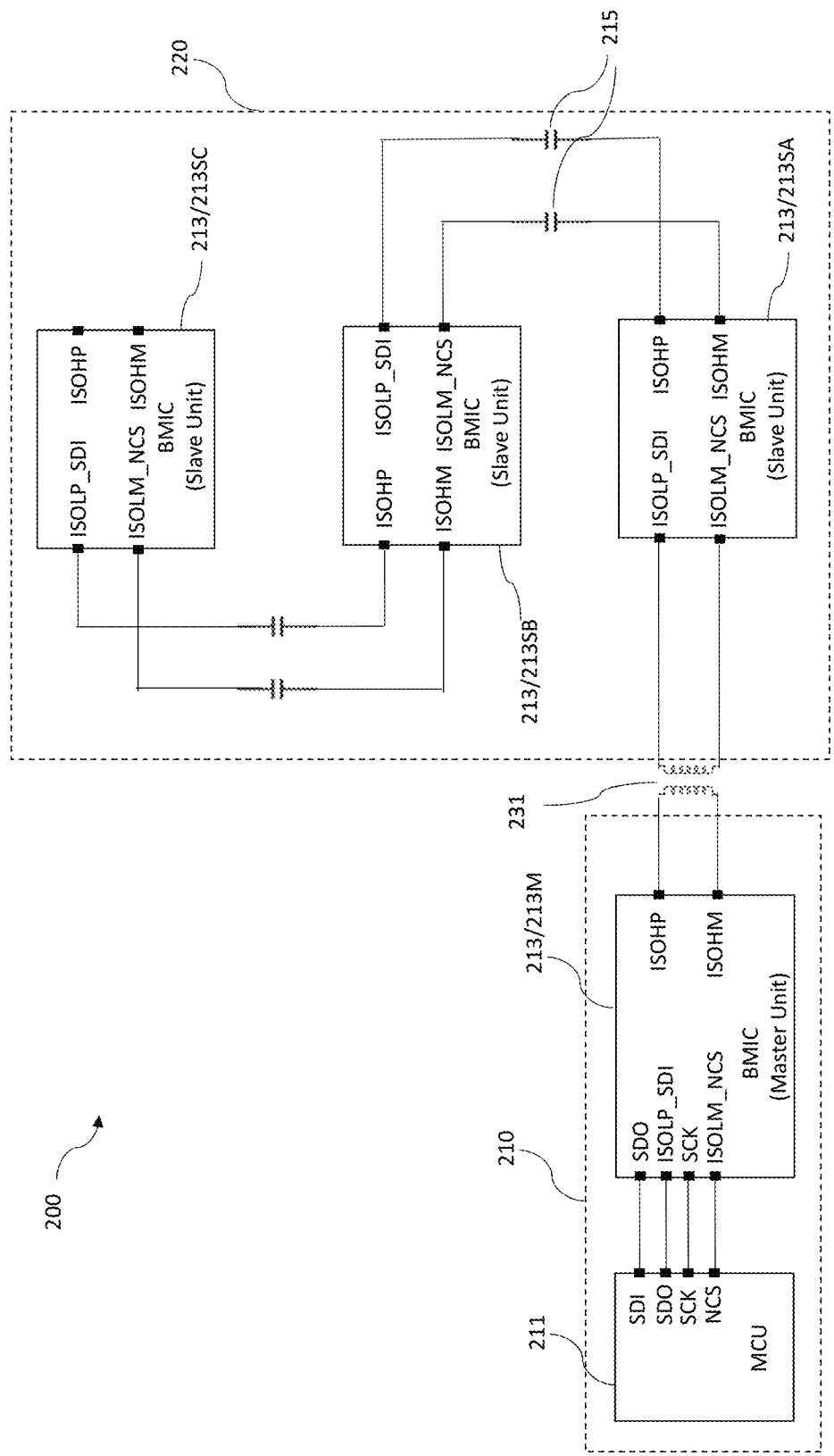
FIG. 2 illustrates a battery management system (BMS), in an embodiment.

FIG. 2 illustrates a battery management system (BMS) 200, in an embodiment. The BMS 200 includes a microcontroller (MCU) 211 and a plurality of BMICs 213 (e.g., 213M, 213SA, 213SB, and 213SC). In the illustrated embodiment, the BMICs 213 in FIG. 2 are the same as the BMIC 100 in FIG. 1. One of the BMICs 213, labeled as 213M, is set to a master mode and may be referred to as master BMIC 213M, and the other BMICs 213, labeled as 213SA, 213SB, and 213SC, are set to a slave mode and may be referred to as slave BMICs 213SA, 213SB, and 213SC. The mode of the BMIC 213 may be set by any suitable method. For example, selection between the master mode and the slave mode of the BMIC 213 may be achieved, e.g., by connecting a mode selection pin of the BMIC 213 to electrical ground or to a supply voltage VDD, or by setting an internal register bit (e.g., an EEPROM bit) of the BMIC 213 to zero or one. The slave BMICs 213SA, 213SB, and 213SC may be collectively referred to as slave BMICs 213S. The number of slave BMICs 213S illustrated in FIG. 2 is merely a non-limiting example, other numbers of slave BMICs 213S may also be used in the BMS 200, as skilled artisans readily appreciate. For simplicity, some of the I/O pins (e.g., SDO, SCK) of the BMIC 100 in FIG. 1 are not illustrated for the slave BMICs 213S in FIG. 2.

The BMS 200 is described below with respect to an example application, namely the battery management system in full electric (FE) vehicles or hybrid electric (HE) vehicles. The structure and principle of the BMS 200 may be used in other applications, as skilled artisans readily appreciate. In the example of FIG. 2, the MCU 211 and the master BMIC 213M may be located on the same printed circuit board (PCB), and the PCB is in a low voltage domain where power supplies with low voltages such as 3V, 5V, or the like are used. The master BMIC 213M is coupled to the MCU 211 through a standard SPI interface, and functions as an interface device between the MCU 211 and the slave BMICs 213S, which slave BMICs 213S communicate through a custom Isolated SPI interface.

As illustrated in FIG. 2, the slave BMICs 213S are connected in a daisy chain configuration. Each of the slave BMICs 213S is located on a separate PCB and is connected to a respective battery pack 110 (see FIG. 1). Each battery pack 110 has a plurality of battery cells 11 coupled together to provide a high voltage of, e.g., 48 V. Therefore, the BMIC 213S are in a high voltage domain 220. In an FE vehicle or a HE vehicle, there are many battery packs 110, and each battery pack (with its respective slave BMIC 213S) may be installed at a different location within the vehicle. The distance between the slave BMICs 213S may be as far as about 10 m. In addition, each PCB on which the BMIC 213 is bonded is powered by the corresponding battery pack 110 (e.g., the BMIC power supply pins are connected to the positive terminal and the negative terminal of the battery pack 110). The different power supplies on the different PCBs do not allow the usage of the standard SPI protocol to connect all the PCBs. Instead, a special (e.g., custom) communication protocol, which not only provides properly decoupling between the different PCBs, but is also robust to noise and compatible with high voltage applications, is used. The Isolated SPI protocol and the Isolated SPI interface described herein, which uses a pair of conductive lines (e.g., a twisted pair) to transmit a differential signal, are suitable for data transmission in these challenging environments.

Figure 3:
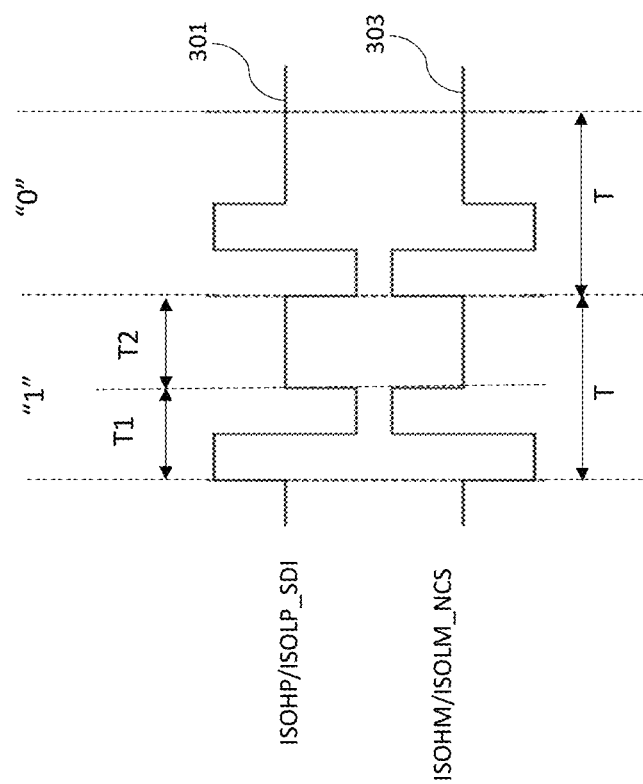
FIG. 3 illustrates an Isolated Serial Peripheral Interface (SPI) signal, in an embodiment.

Referring temporarily to FIG. 3, which shows the Isolated SPI signal (which is a differential signal) used in the Isolated SPI protocol. The differential signal includes a positive signal 301 and a complementary negative signal 303. FIG. 3 shows two bit frames of the Isolated SPI signal, where each bit frame has a duration (referred to as a bit frame duration) of T. The first bit frame carries a digital bit of "1," and the second bit frame carries a digital bit of "0." As illustrated in FIG. 3, each bit frame includes a bit period T1 followed by an idle period T2. In the illustrated embodiment, the bit period T1 has the same duration as the idle period T2 (e.g., T1=T2). During the bit period T1, the positive signal has a stair shape, and changes from a positive value to a negative value, or vice versa. For the positive signal 301 of the Isolated SPI signal, a transition from positive value to negative value in the bit period T1 indicates a digital bit of "1," and a transition from negative value to positive value in the bit period T1 indicates a digital bit of "0." The positive signal 301 has a fixed zero value during the idle period T2. The negative signal 303 is a mirror image (e.g., mirrored along the horizontal line indicating a value of zero) of the positive signal 301. As an example, the Isolated SPI signal may have a bit duration T1 of 125 ns, which corresponds to one clock cycle of an 8 MHz clock, and the idle duration T2 is also 125 ns. Therefore, the bit frame of the above example is 250 ns.

The Isolated SPI signal show in FIG. 3 defines a bit frame T having equal durations for the bit period T1 and the idle period T2 (T1=T2). Compared with a baseline Isolated SPI signal where the idle period T2 is twice as long as the bit period T1, the Isolated SPI signal defined herein allows for higher data rate (e.g., 33.3% higher) than the baseline Isolated SPI signal. The shorter bit frame of the presently disclosed Isolated SPI signal may entail new decoding circuit for the Isolated SPI signal, due to the shorter idle period. Embodiments of the decoding circuit are discussed below with reference to FIGS. 4A-4C and FIGS. 5A-5C. Another advantage of the Isolated SPI signal is that by using differential signaling, the Isolated SPI signal allows for easy galvanic isolation between the PCBs using, e.g., transformers or capacitors.

The Isolated SPI signal shows in FIG. 3 improves data rate by reducing the idle period of the bit frame and by decoding the Isolated SPI signal with the new decoding circuit discussed hereinafter. This is more advantageous than a brute force solution, where the baseline Isolated SPI signal is scaled (e.g., shortened) by half, and the whole baseline decoding circuit is clocked at twice the original clock rate. This is because the higher clock rate of the brute force method may result in more reflections along transmission lines, possible unwanted signal filtering due to passive components and/or parasitic components, less inducted noise robustness along the cable, and dynamic power growth due to frequency increasing, which may require more expensive wires with better shielding, (expensive) electrical termination to avoid signal reflection, and/or modified board design.

Referring back to FIG. 2, the MCU 211 may be an off-the-shelf micro-controller that has a standard SPI interface that communicates with I/O pins labeled as, e.g., SDI, SDO, SCK and NCS in FIG. 2. The master BMIC 213M communicates with the MCU 211 using the standard SPI protocol, and connects with the MCU 211 through I/O pins labeled as SDO, ISOLP_SDI, SCK, and ISOLM_NCS. In addition, the master BMIC 213M communicates with the slave BMIC 213SA using the Isolated SPI protocol through an Isolated SPI interface of the master BMIC 213M, which includes I/O pins of the master BMIC labeled as ISOHP and ISOHM.

In the example of FIG. 2, the I/O pins ISOHP and ISOHM of the master BMIC 213M are coupled to the I/O pins ISOLP_SDI and ISOLM_NCS of the slave BMIC 213SA through a transformer 231. The transformer 231 provides galvanic isolation between the low voltage domain 210 and the high voltage domain 220. The slave BMICs 213S are connected in a daisy chain configuration, and capacitors 215 are used between neighboring slave BMICs 213S to provide decoupling. The capacitors 215 between two neighboring slave BMICs 213S may be replaced by a transformer, as skilled artisans readily appreciate. The slave BMICs 213S communicate with each other using the Isolated SPI protocol. For example, the I/O pins ISOLP_SDI and ISOLM_NCS of each slave BMIC 213S form a first Isolated SPI interface for communication with a previous BMIC 213 in the daisy chain (or the master BMIC 213M), and the I/O pins ISOHP and ISOHM of each slave BMIC 213S form a second Isolated SPI interface for communication with a subsequent slave BMIC 213S (if any) in the daisy chain. Although not shown in FIG. 2, each of the slave BMICs 213S is connected to a respective battery pack 110 (see FIG. 1), and provides measurements of the respective battery pack 110 to the master BMIC 213M through the daisy chain connection using the Isolated SPI protocol.

Referring to FIG. 2 and FIG. 1, to collect measurement data from the battery packs 110 connected to the slave BMICs 213S, the MCU 211 sends a request message with a device identification (ID) number, which device ID number indicates which slave BMIC 213S should report (e.g., send back) the measurement data for its respective battery pack 110. In the illustrate embodiment, the BMS 200 works in a half-duplex mode. For example, the MCU 211 sends a request message with a device ID, then waits for answers from (e.g., the measurement data send by) the slave BMIC 213S having the device ID until a timeout happens. This process repeats until all the slave BMICs 213S sends back their measurement data.

In the example of FIG. 2, the request message is communicated through the standard SPI interface of the MCU 211 to the master BMIC 213M. The master BMIC 213M converts (e.g., translates) the standard SPI signal into a three-pin signal for transmission on the first data bus 102 (see FIG. 1) toward the format converter 109B of the master BMIC 213M. The format converter 109B converts the three-pin signal into an Isolated SPI signal (e.g., a differential signal) for transmission at the I/O pins ISOHP and ISOHM of the master BMIC 213M.

The Isolated SPI signal from the master BMIC 213M is coupled to the I/O pins ISOLP_SDI and ISOLM_NCS of the slave BMIC 213SA through the transformer 231. The decoding circuit 106A of the slave BMIC 213SA decodes the received Isolated SPI signal into the three-pin signal and outputs the three-pin signal on the first data bus 102. The digital control circuit 103 of the slave BMIC 213SA converts the three-pin signal on the first data bus 102 into digital bits (thereby recovering the request message from the MCU 211) and processes the received request message. For example, the digital control circuit 103 compares the device ID in the request message with its own device ID and determines if they match. If the ID numbers do not match, the digital control circuit 103 ignores the request message. If the ID numbers match, the digital control circuit 103 will transmit the measurement data of its respective battery pack 110 back to the master BMIC 213M immediately. The format converter 109B of the slave BMIC 213SA converts the three-pin signal on the first data bus 102 back into the Isolated SPI signal for transmission on the I/O pins ISOHP and ISOHM toward the next slave BMIC 213SB, this may be referred to as "relaying the Isolated SPI signal" to the next slave BMIC 213S. The relaying of the Isolated SPI signal happens as soon as the Isolated SPI signal is received by each slave BMIC 213S, e.g., while the digital control circuit 103 is processing the three-pin signal and regardless of whether the ID numbers match, in order to reduce the delay in the relaying of the Isolated SPI signal in the daisy chain.

Each of the slave BMICs 213SB and 213SC receives the relayed Isolated SPI signal from its preceding slave BMIC 213S in the daisy chain through, e.g., coupling of the capacitors 215. The internal processing of the received Isolated SPI signal in the slave BMICs 213SB and 213SC is the same as that of the slave BMIC 213SA, thus not repeated. After the Isolated SPI signal propagates through the daisy chain and is received by the last slave BMIC 213SC, only one of the slave BMICs 213S (with the matching device ID) will transmit its battery measurement data to the master BMIC 213M.

Without loss of generality, consider the example where the slave BMIC 213SC has a device ID matching that in the request message. When sending back the battery measurement data, the control circuit 103 of the slave BMIC 213SC packs the measurement date in a data frame, and converts the digital bits in the data frame into the three-pin signal, which is send over the second data bus 104 to the format converter 109A of the slave BMIC 213SC. The format converter 109A converts the three-pin signal into an Isolated SPI signal for transmission on the I/O pins ISOLP_SDI and ISOLM_NCS of the slave BMIC 213SC toward the slave BMIC 213SB.

The decoding circuit 106B of the slave BMIC 213SB decodes the received Isolated SPI signal into a three-pin signal, which is sent to the format converter 109A through the second data bus 104. The format converter 109A converts the three-pin signal back into the Isolated SPI signal for transmission on the I/O pins ISOLP_SDI and ISOLM_NCS of the slave BMIC 213SB toward the slave BMIC 213SA. In other words, the slave BMIC 213SB relays the Isolated SPI signal toward the slave BMIC 213SA and the master BMIC 213M.

The slave BMIC 213SA relays the received Isolated SPI signal toward the master BMIC 213M. The processing is the same as or similar to that of the slave BMIC 213SB, thus not repeated.

The master BMIC 213M receives the Isolated SPI signal at the I/O pins ISOHP and ISOHM through the transformer 231. The decoding circuit 106B of the master BMIC 213M decodes the received Isolated SPI signal into a three-pin signal, which is converted into a standard SPI signal by the digital control circuit 103 of the master BMIC 213M. The standard SPI signal is sent back to the MCU 211 through the standard SPI interface of the MCU 211. After the MCU 211 receives the battery measurement data from one of the slave BMICs 213S, the MCU 211 can send another request message with a different device ID and receive the corresponding battery measurement data. This process can be repeated until all of the slave BMICs 213S reports their measurement data.

Figure 4A:
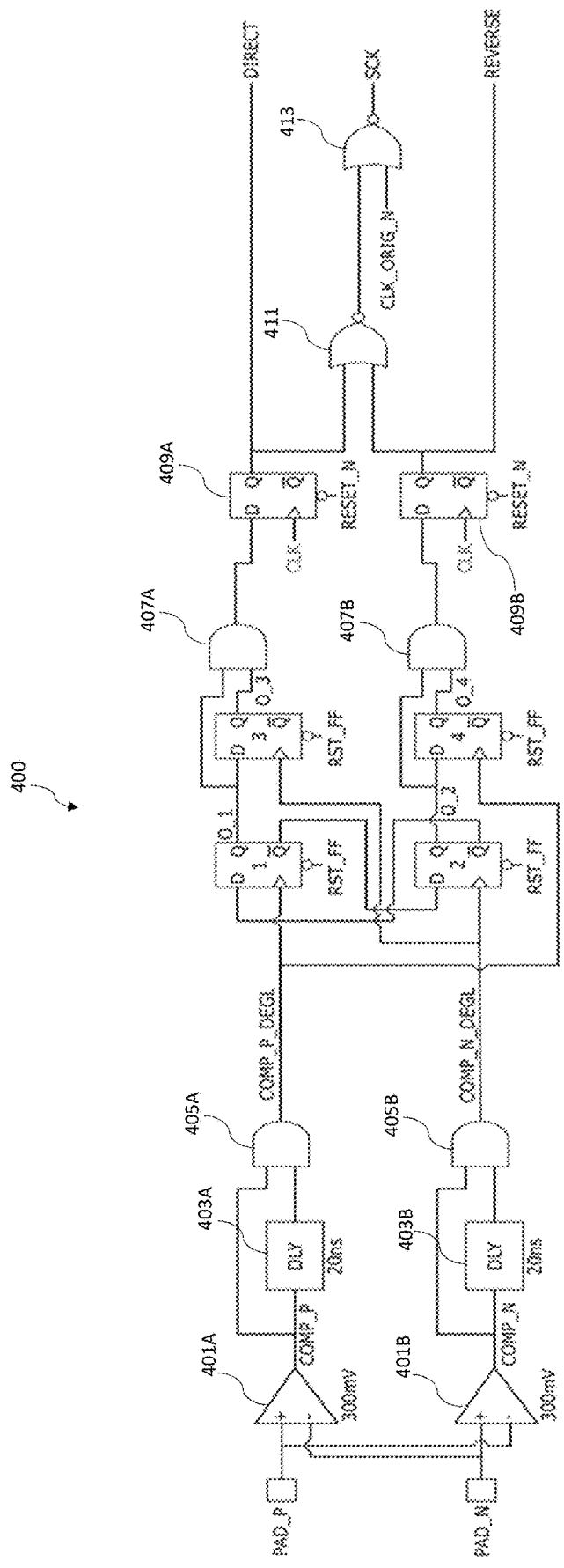
FIGS. 4A-4C together illustrate a schematic view of a decoding circuit for decoding the Isolated SPI signal of FIG. 3, in an embodiment.
Figure 4B:
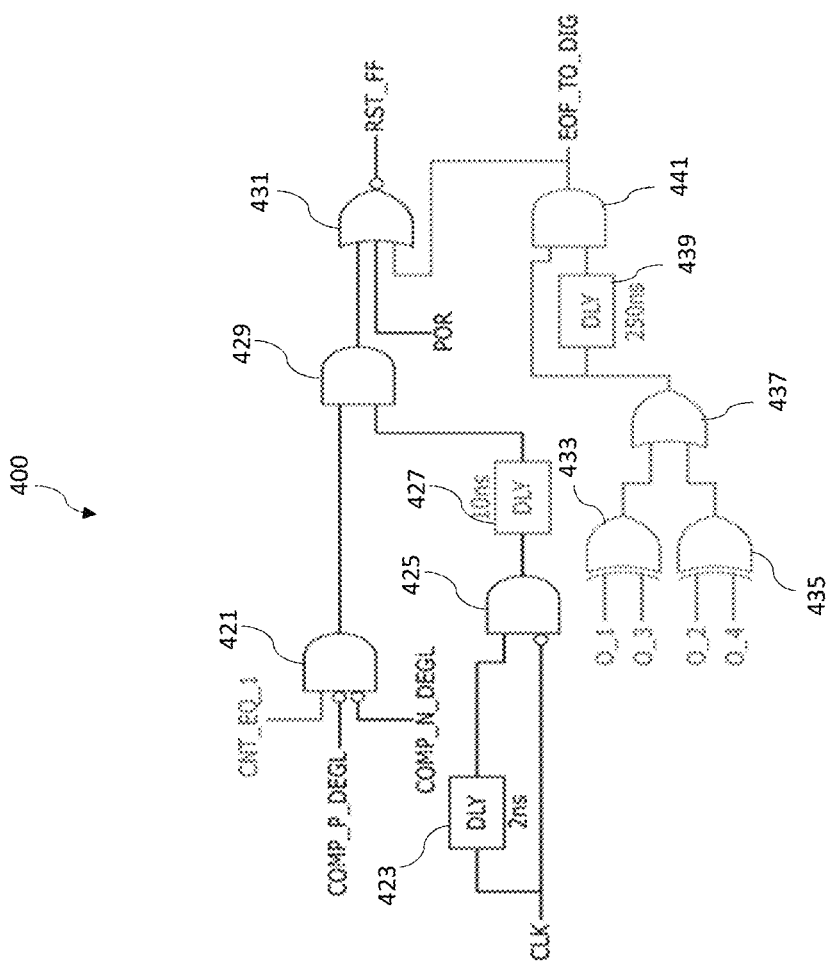
Figure 4C:
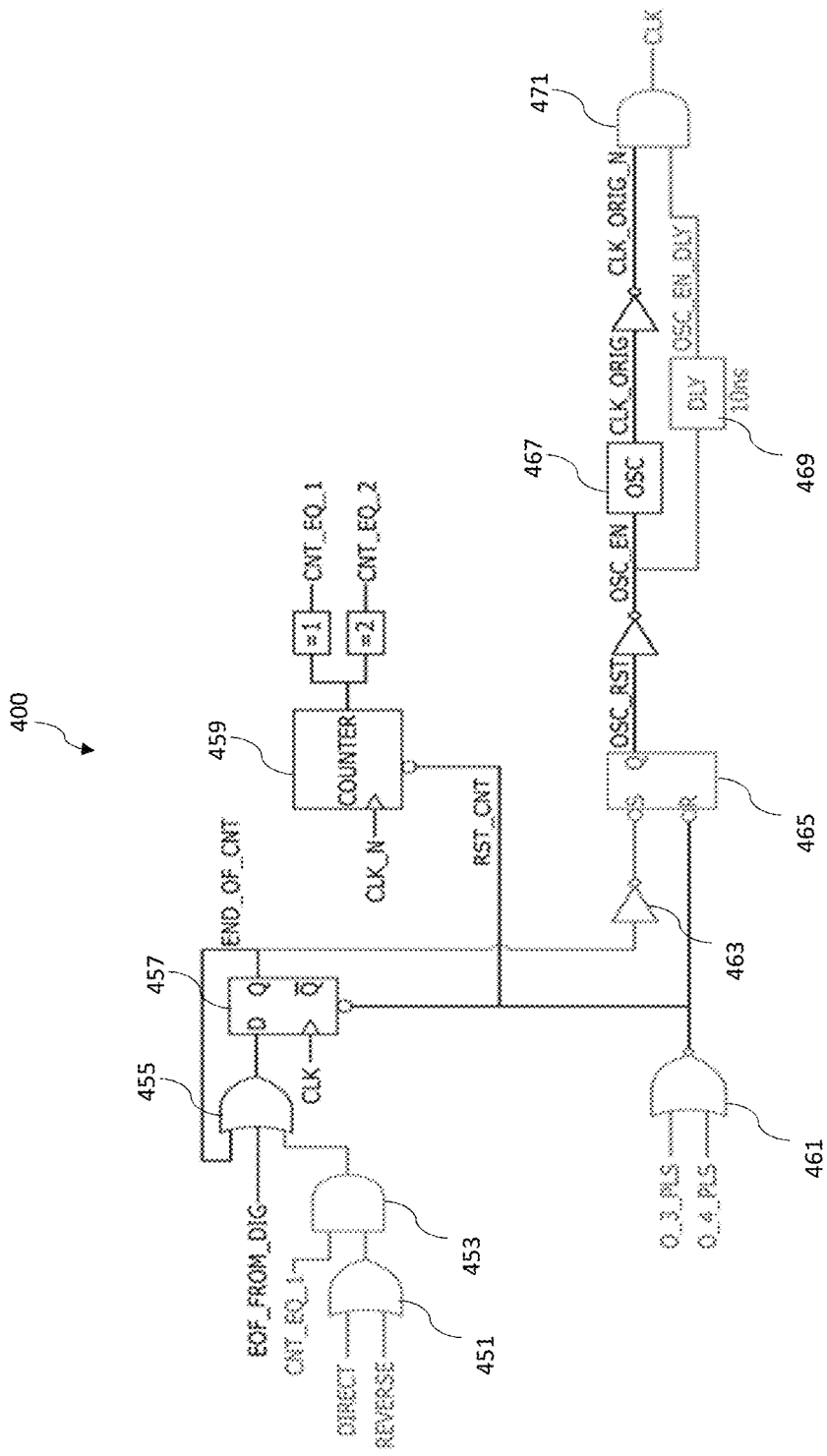

FIGS. 4A-4C together illustrate a schematic view of a decoding circuit 400 for decoding the Isolated SPI signal of FIG. 3, in an embodiment. The circuit in FIG. 4A is the signal detection and synchronization circuit of the decoding circuit 400. As the name suggests, the signal detection and synchronization circuit detects (e.g., decodes) the digital bits carried by the Isolated SPI signal, and generates a three-pin output signal that includes a first data signal labeled as DIRECT, a second data signal labeled as REVERSE, and a synchronization signal labeled as SCK in FIG. 4A.

As illustrated in FIG. 4A, the positive signal and the negative signal of the Isolated SPI signal are connected to the input terminals PAD_P and PAD_N, respectively. The positive signal and the negative signal are compared by a comparator 401A to generate an output signal COMP_P, which is sent to an input terminal of an AND gate 405A. The output signal COMP_P is delayed by a delay element 403A (e.g., having a 20 ns delay), and the output of the delay element 403A is sent to another input terminal of the AND gate 405A. The delay element 403A and the AND gate 405A are used to remove effects of spurious signals (e.g., spurs) in the input signal at the input terminals PAD_P and PAD_N. The output signal of the AND gate 405A is labeled as COMP_P_DEGL. A similar circuit is used to generate an output signal COMP_N_DEGL, using a comparator 401B, a delay element 403B, and an AND gate 405B. The output signals COMP_P_DEGL and COMP_N_DEGL are decoded by the circuit formed by four flip-flops labeled as 1, 2, 3, and 4 in FIG. 4A and two AND gates 407A and 407B. The output of the flip-flops 1, 2, 3, and 4 are labeled as O_1, O_2, O_3, and O_4, respectively. The reset terminals of the flip-flops 1, 2, 3, and 4 are connected to an RST_FF signal, which is generated in FIG. 4B.

The output of the AND gates 407A and 407B are sent to flip-flops 409A and 409B, respectively. The flip-flops 409A and 409B are driven by a signal CLK (e.g., a clock signal), which is generated in FIG. 4C. The outputs of the flip-flops 409A and 409B are the output signals DIRECT and REVERSE, respectively. The outputs of the flip-flops 409A and 409B are processed by NOR gates 411 and 413 to generate the synchronization signal SCK. An input signal CLK_ORIG_N of the NOR gate 413 is generated in FIG. 4C. The signals DIRECT, REVERSE, and SCK form the three-pin signal used in the BMICs 100. The signals DIRECT and REVERSE may be referred to as the data signals of the three-pin signal, and the signal SCK may be referred to as the synchronization signal of the three-pin signal.

FIG. 4B illustrates the end detection and re-initialization circuit of the decoding circuit 400, which functions to detect the end of a bit frame, and in case a bit frame is not detected, a time-out function is performed to re-initialize the detection circuit in preparation for the processing of the next bit frame of the Isolated SPI signal. For example, AND gates 421, 425, and 429 (some having inverted input terminals), an NOR gate 431, and delay elements 423 and 427 are used to generate the reset signal RST_FF. In addition, XOR gates 433 and 435, an OR gate 437, a delay element 439, and an AND gate 441 are used to generate a re-initialization signal when the end of a bit frame is not detected. The POR signal at an input terminal of the NOR gate 431 is a power-on reset signal generated by the BMIC 213 to ensure proper supply voltage.

FIG. 4C illustrates the timing and oscillator control circuit of the decoding circuit 400. In FIG. 4C, a plurality of logic gates (e.g., OR gates 451, 455, an NOR gate 461, an AND gate 453, an inverter 463, a flip-flop 457, and a Set-Reset flip flop 465) are used to generate a control signal OSC_RST, which is then inverted to generate an oscillator enable signal OSC_EN. The oscillator enable signal OSC_EN enables or disables an oscillator 467. The oscillator 467 may be enabled only during time period used for decoding the digital bits, and may be disabled during other time period to save power consumption. In some embodiments, the frequency of the oscillator 467 is the frequency that corresponds to the bit period T1. For example, when the Isolated SPI signal has a bit period T1 of 125 ns, which corresponds to one clock cycle of an 8 MHz clock (⅛ MHz=125 ns), the oscillator 467 has a frequency of 8 MHz. In some embodiments, the frequency of the oscillator 467 is higher than the frequency that corresponds to the bit period T1. The output of the oscillator 467 is inverted, then sent to an input terminal of an AND gate 471. The oscillator enable signal OSC_EN is delayed by a delay element 469, and the output of the delay element 469 is sent to another input terminal of the AND gate 471. The output of the AND gate 471 is the signal CLK (e.g., a clock signal).

FIG. 4C further illustrates a counter 459, which is driven by a CLK_N signal (an inverted CLK signal) and is resets by a reset signal RST_CNT. When the counter output is equal to one, the signal CNT_EQ_1 has a logic high value, otherwise it has a logic low value. Similarly, the counter output is compared with 2 to set the value of the signal CNT_EQ_2. The signals O_3_PLS and O4_PLS are derived from the signals O_3 and O_4, respectively. For example, the signal O_3_PLS is generated by performing a logic AND operation on the signal O_3 and an inverted and delayed version (e.g., delayed by a few nanoseconds) of the signal O_3. The signal O_4_PLS is generated similarly use the logic AND operation.

Figure 4D:
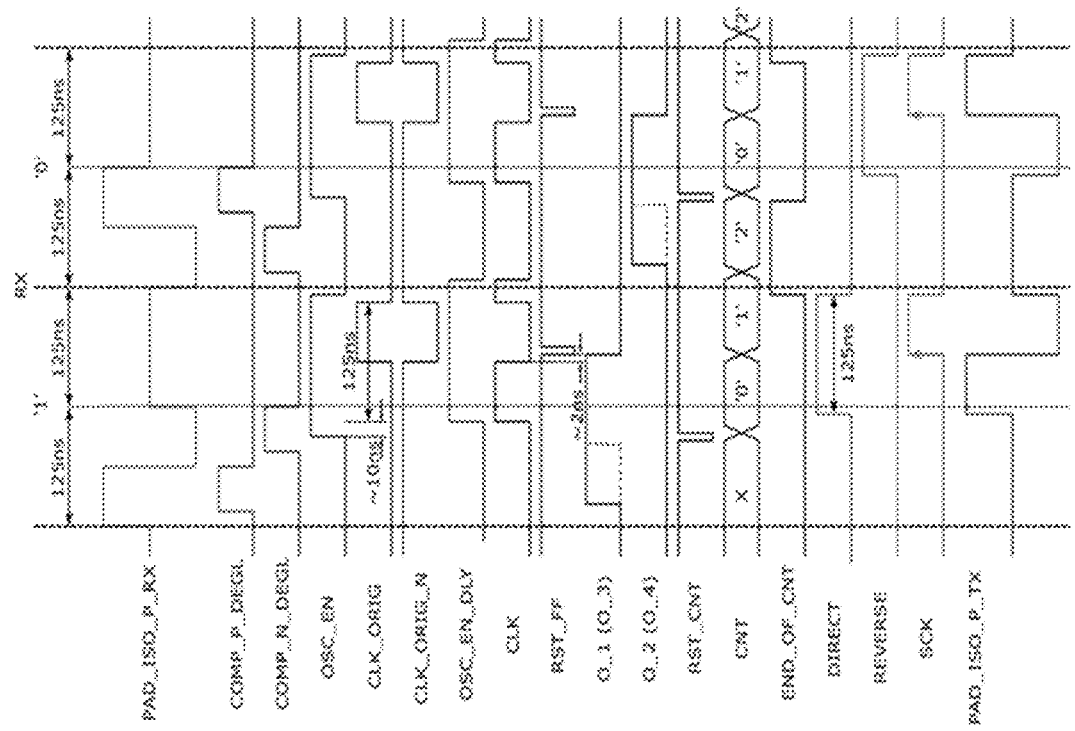
FIG. 4D illustrates a timing diagram for the decoding circuit of FIGS. 4A-4C, in an embodiment.

FIG. 4D illustrates a timing diagram for the decoding circuit 400 of FIGS. 4A-4C, in an embodiment. The signal labeled as PAD_ISO_P_RX at the top of FIG. 4D illustrates the positive signal of the received Isolated SPI signal. The signals labeled as DIRECT, REVERSE, and SCK at the bottom of FIG. 4D show the three-pin signal generated by the decoding circuit 400. In FIG. 4D, the first bit frame of the received Isolated SPI signal carries a bit "1," and the second bit frame carries a bit "0." For bit frame that carries a bit "1," the decoding circuit 400 generates a positive pulse in the signal DIRECT during that bit frame. The positive pulse has a same duration (e.g., 125 ns) as the bit period. In the example of FIG. 4D, the positive pulse in the signal DIRECT is generated near the end of the bit period of the bit frame carrying a bit "1," and as a result, the rising edge of the positive pulse is generated shortly before the start of the idle period of the bit frame, and the falling edge of the positive pulse is generated shortly before the end of the idle period of the bit frame. The signal DIRECT stays at a logic low value at time instants outside the positive pulse in the signal DIRECT.

Still referring to FIG. 4D, for each positive pulse generated in the signal DIRECT, the decoding circuit 400 generates a corresponding positive pulse in the synchronization signal SCK, which has a shorter duration than, and is located within the duration of, the positive pulse in the signal DIRECT. To decode the digital bit carried by the bit frame, the signal DIRECT is sampled at the rising edge of the positive pulse in the synchronization signal SCK: a logic high value at the rising edge indicates a bit "1," and a logic low value at the rising edge indicates a bit "0."

As illustrated in FIG. 4D, for each bit frame that carries a bit "0," the decoding circuit 400 generates a positive pulse in the signal REVERSE during that bit frame, which positive pulse is generated near the end of the bit period of the bit frame carrying the bit "0," and as a result, the rising edge of the positive pulse is generated shortly before the start of the idle period of the bit frame, and the falling edge of the positive pulse is generated shortly before the end of the idle period of the bit frame. The signal REVERSE remains at a logic low value at time instants outside the positive pulse in the signal REVERSE.

The signal labeled as PAD_ISO_P_TX at the bottom of FIG. 4D illustrates the positive signal of the Isolated SPI signal converted from the three-pin signal (e.g., DIRECT, REVERSE, and SCK), which corresponds to the output of the format convert 109A or 109B.

Figure 5A:
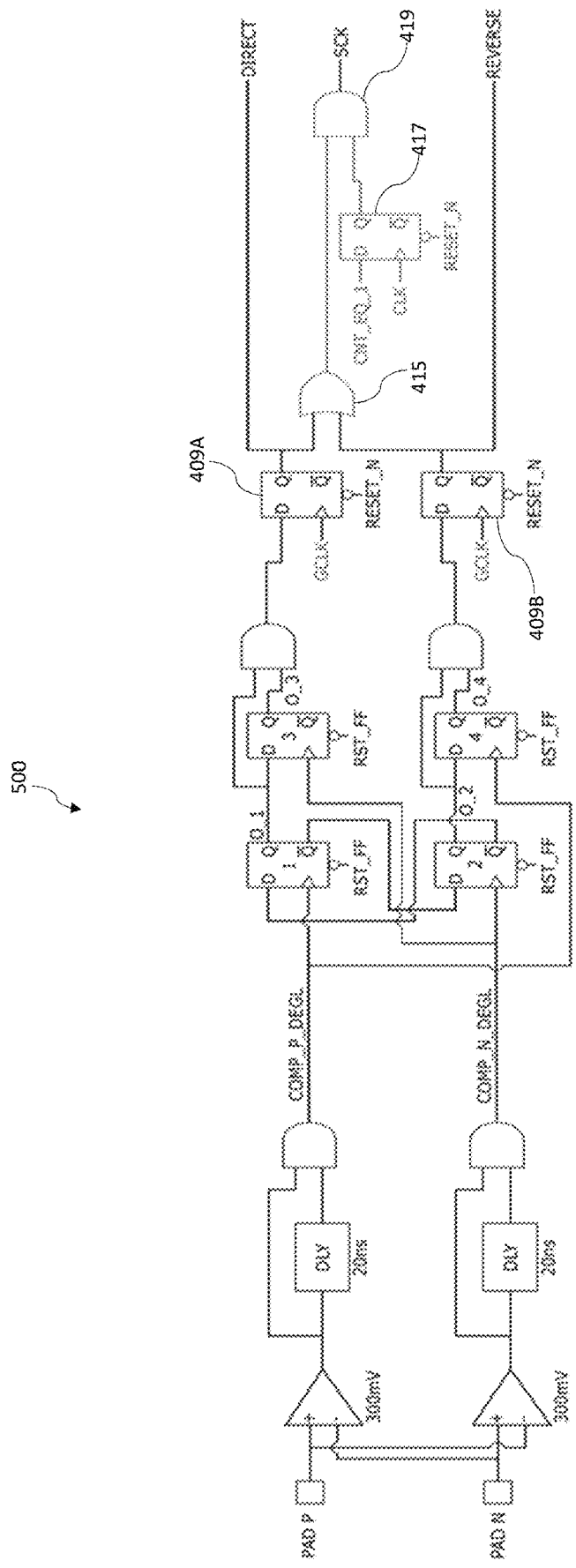
FIGS. 5A-5C together illustrate a schematic view of a decoding circuit for decoding the Isolated SPI signal of FIG. 3, in another embodiment.
Figure 5B:
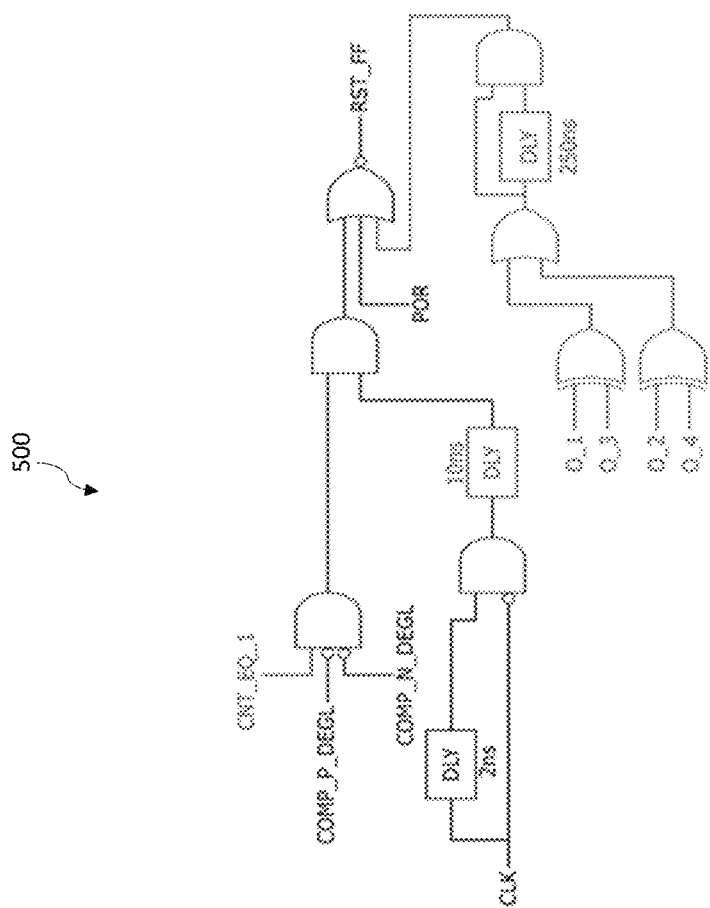
Figure 5C:
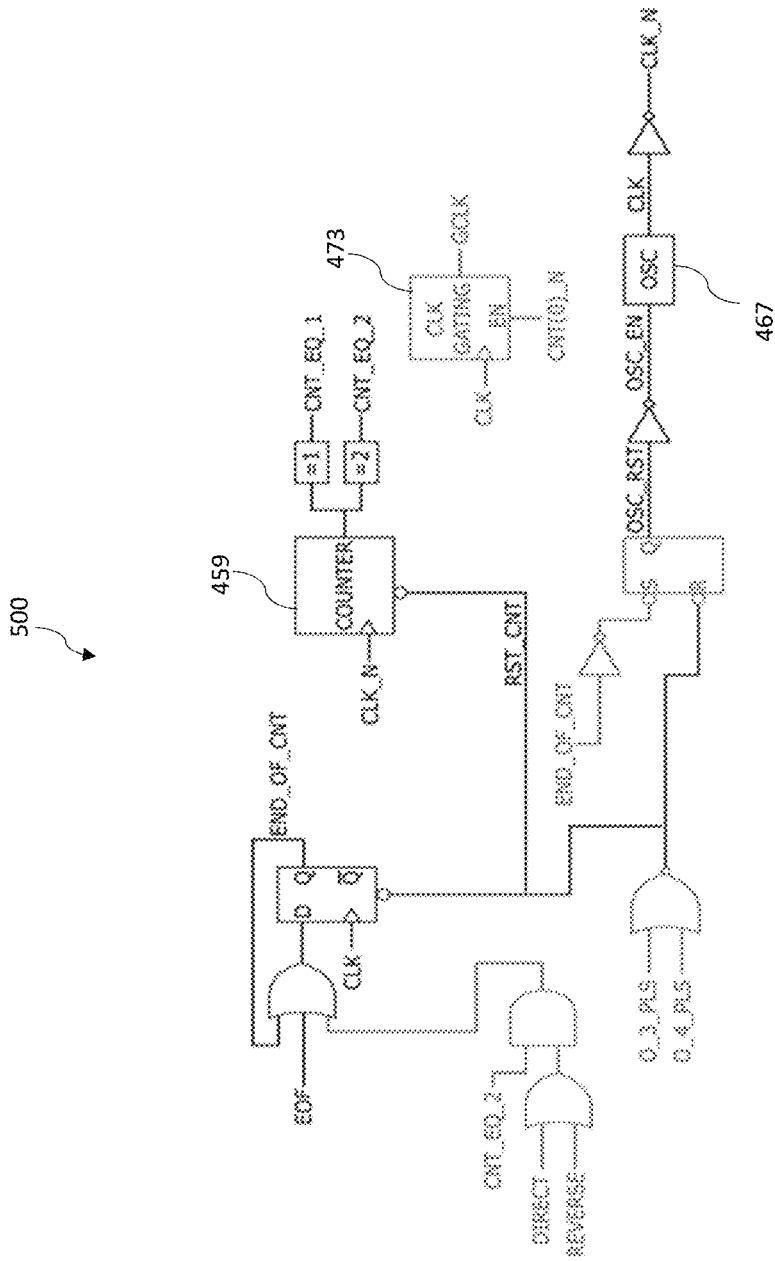

FIGS. 5A-5C together illustrate a schematic view of a decoding circuit 500 for decoding the Isolated SPI signal of FIG. 3, in another embodiment. The decoding circuit 500 uses an oscillator 467 (see FIG. 5C) having a frequency that is twice the frequency corresponding to the bit period of the Isolated SPI signal. For example, if the bit period is 125 ns (which corresponds to one clock cycle of an 8 MHz clock), then the oscillator 467 has a frequency of 16 MHz. The circuit in FIG. 5A is the signal detection and synchronization circuit of the decoding circuit 500, which is similar to that in FIG. 4A. In FIG. 5A, the flip-flops 409A and 409B are driven by a GCLK signal, which is generated in FIG. 5C. In addition, the synchronization signal SCK of the three-pin signal is generated using an OR gate 415, an AND gate 419, and a flip-flop 417.

FIG. 5B illustrates the end detection and re-initialization circuit of the decoding circuit 500, which is the same as that in FIG. 4B. FIG. 5C illustrates the timing and oscillator control circuit of the decoding circuit 500, which is similar to that in FIG. 4C, but with the output of the oscillator 467 gated by a clock gating circuit 473 to generate the GCLK signal. In some embodiments, the clock gating circuit 473 comprises a latch and an AND gate, and is configured to receive a clock signal and generates a gated clock signal according to an enable signal. The clock gating circuit 473 is enabled by a CNT(0)_N signal, where the CNT(0)_N signal has a logic high value when the least significant bit (LSB) of the counter 459 is zero, and has a logic low value when the LSB of the counter 459 is one.

Figure 5D:
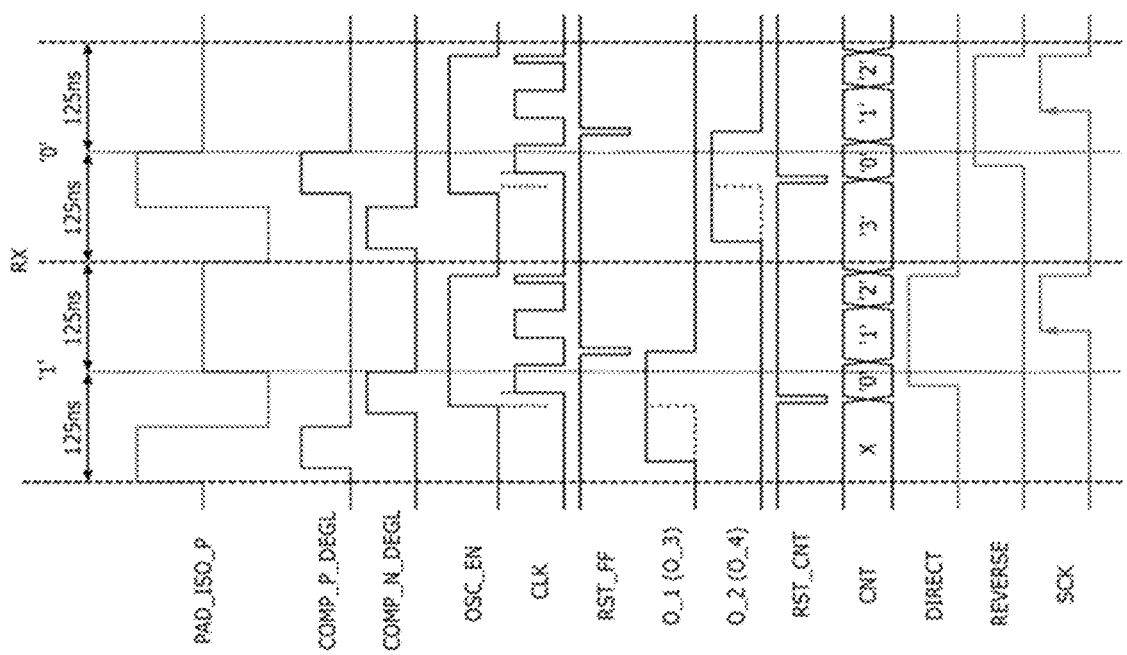
FIG. 5D illustrates a timing diagram for the decoding circuit of FIGS. 5A-5C, in an embodiment.

FIG. 5D illustrates a timing diagram for the decoding circuit of FIGS. 5A-5C, in an embodiment. The timing diagram in FIG. 5D shows various signals generated by the decoding circuit 500 when decoding the Isolated SPI signal of FIG. 3. Details are similar to those in FIG. 4D, thus not repeated.

FIG. 5E illustrates a timing diagram for the decoding circuit of FIGS. 5A-5C, in another embodiment. In the example of FIG. 5E, a modified version of the Isolated SPI signal is sent as the input signal to the decoding circuit 500. The modified version of the Isolated SPI signal is illustrated by the top signal in FIG. 5E. The idle period of the modified Isolated SPI signal has a duration of 62.5 ns, which is half of the duration of the bit period 125 ns. This modified Isolated SPI signal allows for even higher data transmission rate due to a shorter bit frame. The decoding circuit 500 is able to decode the modified Isolated SPI signal correctly, as illustrated by FIG. 5E.

Figure 6:
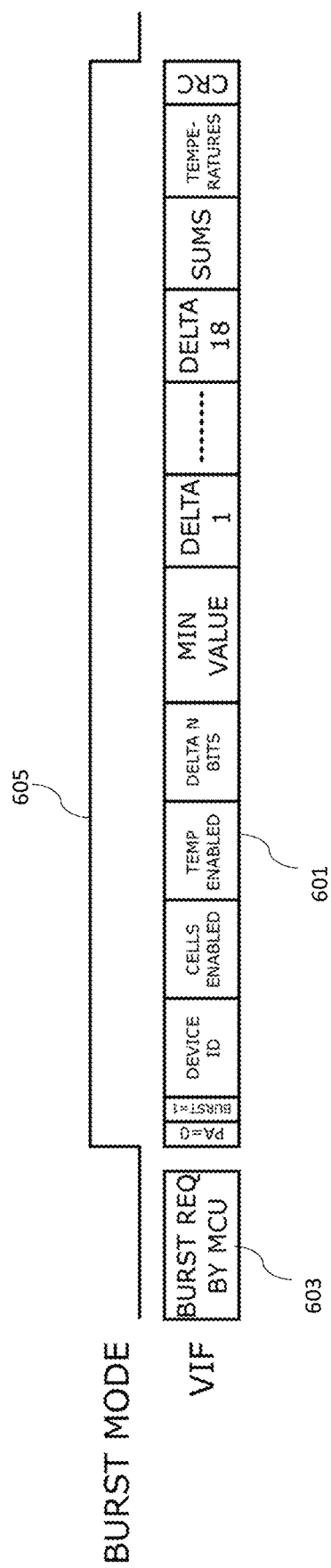
FIG. 6 illustrates a frame structure for the measurement data of each battery pack, in an embodiment.

FIG. 6 illustrates a frame structure 601 for the measurement data of each battery pack, in an embodiment. In some embodiments, the digital control circuit 103 of each slave BMIC 213S packs all the measurement data from the battery pack 110 into a frame (e.g., a single frame), and send the frame in a burst mode to the MCU 211. FIG. 6 also illustrates the burst request 603 (e.g., a request message) from the MCU 211, and a pulse 605 indicating the duration of the burst mode transmission of the battery measurement data. The burst mode transmission differs from a non-burst mode transmission, where in the non-burst mode transmission, the measurement data from each cell 111 of the battery pack 110 is packed into a frame (also referred to as a classic frame to distinguish from the burst mode frame structure 601) and transmitted. Since each frame has its overhead bits (e.g., bits used for forming the frame structure but not used for carrying the payload data such as battery measurement data), and since each battery pack 110 has multiple cells 111, the overhead bits reduce the number of payload bits (e.g., the battery measurement data) that could be transmitted per second. The frame structure 601 disclosed herein, by packing measurement from all cells 111 of a battery pack 110 into a single frame, reduces the number of overhead bits needed to transmit all the measurement data, thereby increasing the payload data rate. The frame structure 601 is able to transmit all of the measurement data from a battery pack that has up to 18 batter cells (e.g., 18 voltage measurements for the 18 cells), 9 temperature sensors (e.g., 9 temperature measurements), and 3 voltage sum signals.

FIG. 7 shows the data fields within the frame structure 601, the number of bits for each data field, and the description of each data field. Referring to FIG. 7, the PA data field is used to indicate whether the current frame of data is a command sent by a master unit or an answer (e.g., battery measurement data) from a slave unit. The BURST data field indicates whether the current frame is a long frame having the burst mode frame structure 601, or a classic frame (e.g., for backward compatibility purpose). The DEV ID data field identifies the device ID of the slave BMIC 213S reporting its battery measurement data. The CELLS ENABLED data field has 18 bits, and indicates bit-by-bit which cells are enabled (e.g., measured). For example, if the first cell of the battery pack is enabled, then the first bit in this data field has a value of 1. The TEMP ENABLED data field has 9 bits, and indicates bit-by-bit which temperature sensors are enabled (e.g., measured).

To further improve payload data transmission rate, the voltage measurement data from all of the cells in the battery pack are processed by a data compression method to reduce the number of bits transmitted. For example, to compress the 18 voltage measurement values for the 18 cells of the battery pack, the minimum value of the 18 voltage measurement values is determined, and 18 voltage difference values are calculated by subtracting the minimum value from the 18 voltage measurement values. Since the voltage differences between the battery cells within a battery pack tend to be small, the 18 voltage difference values are small and can be represented by fewer bits than the original 18 voltage measurement values. In the frame structure 601, the minimum value and the 18 voltage difference values are sent. The minimum value is assigned 16 bits and stored in the MIN VALUE field. Each of the 18 voltage difference values is assigned N number of bits, where N is indicated by a four-bit value stored in the DELTA N BITS data field. Up to 18 data fields, labeled as data field DELTA 1-DELTA 18 and each having a field width of N+1 bit, are used to store up to 18 voltage difference values. Note that only measurement data from battery cells indicated as being enabled by the CELLS ENABLED data field are packed in the frame structure 601, this further increases the payload efficiency of the frame structure 601.

Still referring to FIG. 7, the SUMS data field comprises measurements for up to three voltage sum signals, where each voltage sum signal is assigned 16 bits. The TEMPERATURES data field stores up to nine temperature measurement data, where each temperature measurement is assigned 12 bits. The CRC data field includes a 10-bit cyclic redundancy check (CRC) bits for the frame structure 601.

As discussed above, the disclosed bit frame (e.g., with a short idle period) of the Isolated SPI signal improves data rate at the physical layer. In addition, the disclosed burst mode frame structure improves data rate at the data link layer. These improvements allow high speed data transfer of battery measurement data that may be un-achievable previously. For example, in a battery management system for automobile applications, there may be up to 62 battery packs, where each battery pack reports measurement data for 18 battery cells, 9 temperature sensors, and three voltage sum signals. The MCU 211 of the battery management system 200 may send request message to each of the slave BMIC 213S sequentially, and receive the battery measurement data from each battery pack in a burst mode transmission. The total time needed for the MCU 211 to request and receive measurement data from all 62 battery packs may be estimated as follows: assuming that the request message from the MCU is a data frame containing 40 bits, an inter-frame duration (e.g., a waiting period between frames of data transmitted and/or received) of 1 µs is used between data frames, and the Isolated SPI signal has a bit frame of 250 ns. The maximum number of bits in the burst frame structure 601 is 510 bits. The total (maximum) time needed is therefore estimated by:

$$T_{total\_comm} = N_{dev} \cdot [(T_{frame_{resp}} + T_{interframe}) + (T_{frame_{req}} + T_{interframe})] = 62 \cdot [(510 \text{ bits} \cdot 250 \text{ ns} + 1 \text{ µs}) + (40 \text{ bits} \cdot 250 \text{ ns} + 1 \text{ µs})] \approx 8.65 \text{ ms}$$

In other words, the MCU 211 is able to collect measurement data from all 62 battery packs in less than 10 ms. By properly balancing the cells of each battery pack to reduce the number of bits needed for the voltage difference (e.g., indicated by the DELTA N BITS data field) to 8, it is possible to further reduce the total time in the above calculation to about 6.4 ms. In scenarios where all of the cells of the battery pack have the same voltage, the communication time used for sending the DELTA N BITS data field and the DELTA1-DELTA 18 data field is greatly reduced, which saves power consumption, or alternatively, the data transmission time saved can be used to transmit other types of measurement data. In some embodiment, the time saving is used to transmit the same measurement data from the battery packs at higher frequency, which enables reconstruction of the state (e.g., condition) of the battery packs with higher precision. The ability to collect measurements from all battery packs in such a short period of time allows the battery management system 200 to achieve real-time or near real-time control of the battery packs to improve reliability, safety, and performance of the system.

Embodiments may achieve advantages. For example, the disclosed Isolated SPI signal uses a differential signal for data communication, which provides easy galvanic isolation between different voltage domains. The Isolated SPI signal has a short bit frame duration (e.g., bit period and idle period having equal duration) to increase the data rate transmitted through the Isolated SPI interface. Various embodiments of decoding circuits for the Isolated SPI signal are disclosed. To further increase the data rate, a burst mode frame structure is disclosed. In the burst mode, the measurement from all cells within a battery is packed into a single frame (e.g., to save overhead bits) for transmission. The disclosed circuits and protocol allow for high speed data communication between the MCU 211 and the battery packs (through the slave BMICs 213S) for better battery management performance.

Example embodiments of the present invention are summarized here. Other embodiments can also be understood from the entirety of the specification and the claims filed herein.

Example 1. In an embodiment, an integrated circuit (IC) device includes: a first plurality of input/output (I/O) pins; a first interface circuit coupled to the first plurality of I/O pins, wherein the first interface circuit comprises a first decoding circuit and a first format converter; a second plurality of I/O pins; a second interface circuit coupled to the second plurality of I/O pins, wherein the second interface circuit comprises a second decoding circuit and a second format converter; a first data bus coupled between outputs of the first decoding circuit and inputs of the second format converter; a second data bus coupled between outputs of the second decoding circuit and inputs of the first format converter; and a digital control circuit coupled to the first data bus and the second data bus, wherein each of the first decoding circuit and the second decoding circuit is configured to decode an Isolated Serial Peripheral Interface (SPI) signal into a three-pin signal, wherein the Isolated SPI signal is a differential signal comprising a positive signal and a complementary negative signal, wherein a bit frame of the positive signal includes a bit period and an idle period that have a same duration, wherein the three-pin signal includes a first data signal, a second data signal, and a synchronization signal, wherein each of the first format converter and the second format converter is configured to convert the three-pin signal into the Isolated SPI signal.

Example 2. The IC device of Example 1, wherein the digital control circuit is configured to convert the three-pin signal from the first data bus or the second data bus into digital bits by sampling the first data signal of the three-pin signal at rising edges of the synchronization signal.

Example 3. The IC device of Example 1, wherein in a bit frame, the idle period follows the bit period, wherein during the bit period, the positive signal changes from a positive value to a negative value, or vice versa, wherein in the idle period, the positive signal remains at a zero value.

Example 4. The IC device of Example 3, wherein for each bit frame of the Isolated SPI signal, each of the first decoding circuit and the second decoding circuit is configured to decode the Isolated SPI signal by: generating a positive pulse in the first data signal if the bit frame carries a digital bit of one, or generating a positive pulse in the second data signal if the bit frame carries a digital bit of zero, wherein a rising edge of the positive pulse is generated before a start of the idle period of the bit frame, and a falling edge of the positive pulse is generated before an end of the idle period of the bit frame; and generating a positive synchronization pulse in the synchronization signal, wherein a rising edge of the positive synchronization pulse is between the rising edge and the falling edge of the positive pulse in the first data signal or in the second data signal.

Example 5. The IC device of Example 4, wherein a duration of the positive pulse is the same as that of the bit period.

Example 6. The IC device of Example 1, further comprising a third plurality of I/O pins, wherein the digital control circuit is couple to the third plurality of I/O pins and the first plurality of I/O pins.

Example 7. The IC device of Example 6, wherein the IC device is configured to function in a master mode or a slave mode, wherein in the master mode, the IC device is configured to: receive a standard SPI signal through the first plurality of I/O pins and the third plurality of I/O pins; convert, by the digital control circuit, the standard SPI signal into the three-pin signal; send the three-pin signal to the second format converter through the first data bus; convert, by the second format converter, the three-pin signal into a first Isolated SPI signal; and output the first Isolated SPI signal at the second plurality of I/O pins.

Example 8. The IC device of Example 7, wherein in the master mode, the IC device is further configured to: receive, at the second plurality of I/O pins, a second Isolated SPI signal; decoding, by the second decoding circuit, the second Isolated SPI signal into the three-pin signal; receive, by the digital control circuit, the three-pin signal through the second data bus; convert, by the digital control circuit, the three-pin signal into the standard SPI signal; and output the standard SPI signal at the first plurality of I/O pins and the third plurality of I/O pins.

Example 9. The IC device of Example 8, wherein in the slave mode, the IC device is configured to: receive a third Isolated SPI signal at the first plurality of I/O pins; decode, by the first decoding circuit, the third Isolated SPI signal into the three-pin signal; convert, by the digital control circuit, the three-pin signal into digital bits; process, by the digital control circuit, the digital bits; and relay the third isolated SPI signal by outputting the third Isolated SPI signal at the second plurality of I/O pins.

Example 10. The IC device of Example 9, where the digital bits comprises an identification (ID) number, wherein the digital control circuit is configured to process the digital bits by: comparing the ID number with a device ID of the IC device; and in response to determining that the ID number matches the device ID of the IC device, sending a frame of data to the first plurality of I/O pins by: converting the frame of data into the three-pin signal; and sending the three-pin signal to the first format converter, wherein the first format converter is configured to convert the three-pin signal into a fourth Isolated SPI signal and output the fourth Isolated SPI signal at the first plurality of I/O pins.

Example 11. The IC device of Example 9, wherein in the slave mode, the IC device is further configured to: receive, at the second plurality of I/O pins, a fifth Isolated SPI signal; and relay the fifth Isolated SPI signal by outputting the fifth Isolated SPI signal at the first plurality of I/O pins.

Example 12. In an embodiment, a battery management system includes: a controller; a master battery management integrated circuit (BMIC) device coupled to the controller and configured to communicate with the controller through a standard Serial Peripheral Interface (SPI) protocol; a first slave BMIC device, wherein a first Isolated SPI interface of the first slave BMIC device is coupled to an Isolated SPI interface of the master BMIC through galvanic isolation, wherein the first slave BMIC device is configured to be coupled to a first battery pack, wherein the Isolated SPI interface is a two-pin communication interface using a differential signal comprising a positive signal and a complementary negative signal, wherein a bit frame of the positive signal includes a bit period followed by an idle period that has a same duration as the bit period; and a second slave BMIC device, wherein a first Isolated SPI interface of the second slave BMIC device is coupled to a second Isolated SPI interface of the first slave BMIC device through galvanic isolation, wherein the second slave BMIC device is configured to be coupled to a second battery pack.

Example 13. The battery management system of Example 12, wherein the first Isolated SPI interface of the first slave BMIC device is coupled to the Isolated SPI interface of the master BMIC through a first transformer, wherein the first Isolated SPI interface of the second slave BMIC device is coupled to the second Isolated SPI interface of the first slave BMIC device through a second transformer or through capacitors.

Example 14. The battery management system of Example 12, wherein the controller and the master BMIC device are disposed on a first printed circuit board (PCB), and the first slave BMIC device is disposed on a second PCB, wherein the first PCB and the second PCB are in different power domains.

Example 15. The battery management system of Example 12, wherein the battery management system is configured to: send, by the controller, a first standard SPI signal to the master BMIC device, the first standard SPI signal comprising a message that includes a request for battery measurement and an identification (ID) number; convert, by the master BMIC device, the standard SPI signal into a first Isolated SPI signal at the Isolated SPI interface of the master BMIC device; receive, by the first slave BMIC device, the first Isolated SPI signal through the first Isolated SPI interface of the first slave BMIC device; relay, by the first slave BMIC device, the first Isolated SPI signal to the second Isolated SPI interface of the first slave BMIC device; decode, by the first slave BMIC device, the first Isolated SPI signal into digital bits; and process, by the first slave BMIC device, the digital bits, comprising: comparing the ID number with a device ID of the first slave BMIC device; and in response to determining that the ID number matches the device ID, sending measurement data of the first battery pack to the master BMIC device through the first Isolated SPI interface as a second Isolated SPI signal.

17

Example 16. The battery management system of Example 15, wherein the first battery pack comprises a plurality of battery cells, wherein the measurement data include measurements for the plurality of battery cells, wherein measurements for the plurality of battery cells are packed in a single data frame, wherein the first slave BMIC device is configured to send the single data frame in a burst mode transmission.

Example 17. In an embodiment, a battery system includes: a battery pack comprising a plurality of battery cells; and a battery management integrated circuit (BMIC) device coupled to the batter pack, the BMIC device comprising: a first plurality of input/output (I/O) pins; a first interface circuit coupled to the first plurality of I/O pins, wherein the first interface circuit comprises a first decoding circuit and a first format converter; a second plurality of I/O pins; a second interface circuit coupled to the second plurality of I/O pins, wherein the second interface circuit comprises a second decoding circuit and a second format converter; a first data bus coupled between outputs of the first decoding circuit and inputs of the second format converter; a second data bus coupled between outputs of the second decoding circuit and inputs of the first format converter; a digital control circuit coupled to the first data bus and the second data bus; and analog-to-digital converters (ADCs) coupled between the digital control circuit and the battery pack, wherein each of the first decoding circuit and the second decoding circuit is configured to decode an Isolated Serial Peripheral Interface (SPI) signal into a three-pin signal, wherein the Isolated SPI signal is a differential signal comprising a positive signal and a complementary negative signal, wherein a bit frame of the positive signal includes a bit period and an idle period that have a same duration, wherein the three-pin signal includes a first data signal, a second data signal, and a synchronization signal, wherein each of the first format converter and the second format converter is configured to convert the three-pin signal into the Isolated SPI signal.

Example 18. The battery system of Example 17, wherein in a bit frame of the positive signal, the idle period follows the bit period, wherein during the bit period, the positive signal transitions from a positive value to a negative value, or vice versa, wherein in the idle period, the positive signal remains at a zero value, wherein the digital control circuit is configured to convert the three-pin signal into digital bits by sampling the first data signal of the three-pin signal at rising edges of the synchronization signal.

Example 19. The battery system of Example 18, wherein for each bit frame of the Isolated SPI signal, each of the first decoding circuit and the second decoding circuit is configured to decode the Isolated SPI signal by: generating a positive pulse in the first data signal if the bit frame carries a digital bit of one, or generating a positive pulse in the second data signal if the bit frame carries a digital bit of zero, wherein a rising edge of the positive pulse is generated before a start of the idle period of the bit frame, and a falling edge of the positive pulse is generated before an end of the idle period of the bit frame; and generating a positive synchronization pulse in the synchronization signal, wherein a rising edge of the positive synchronization pulse is between the rising edge and the falling edge of the positive pulse in the first data signal or in the second data signal.

Example 20. The battery system of Example 17, wherein the BMIC device is configured to: collect, by the digital control circuit, outputs from the ADCs, wherein the outputs from the ADCs comprise measurements for the plurality of battery cells of the battery pack; compress, by the digital control circuit, the measurements for the plurality of battery cells into few data bits using a data compression method based on voltage differences among the plurality of battery cells; pack, by the digital control circuit, the compressed measurements for the plurality of battery cells in a data frame; and send, by the first interface circuit, the data frame in a burst mode of transmission as a first Isolated SPI signal.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An integrated circuit (IC) device comprising:
a first plurality of input/output (I/O) pins;
a first interface circuit coupled to the first plurality of I/O pins, wherein the first interface circuit comprises a first decoding circuit and a first format converter;
a second plurality of I/O pins;
a second interface circuit coupled to the second plurality of I/O pins, wherein the second interface circuit comprises a second decoding circuit and a second format converter;
a first data bus coupled between outputs of the first decoding circuit and inputs of the second format converter;
a second data bus coupled between outputs of the second decoding circuit and inputs of the first format converter; and
a digital control circuit coupled to the first data bus and the second data bus, wherein each of the first decoding circuit and the second decoding circuit is configured to decode an Isolated Serial Peripheral Interface (SPI) signal into a three-pin signal, wherein the Isolated SPI signal is a differential signal comprising a positive signal and a complementary negative signal, wherein a bit frame of the positive signal includes a bit period and an idle period that have a same duration, wherein the three-pin signal includes a first data signal, a second data signal, and a synchronization signal, wherein each of the first format converter and the second format converter is configured to convert the three-pin signal into the Isolated SPI signal.

2. The IC device of claim 1, wherein the digital control circuit is configured to convert the three-pin signal from the first data bus or the second data bus into digital bits by sampling the first data signal of the three-pin signal at rising edges of the synchronization signal.

3. The IC device of claim 1, wherein in a bit frame, the idle period follows the bit period, wherein during the bit period, the positive signal changes from a positive value to a negative value, or vice versa, wherein in the idle period, the positive signal remains at a zero value.

4. The IC device of claim 3, wherein for each bit frame of the Isolated SPI signal, each of the first decoding circuit and the second decoding circuit is configured to decode the Isolated SPI signal by:
generating a positive pulse in the first data signal if the bit frame carries a digital bit of one, or generating a positive pulse in the second data signal if the bit frame carries a digital bit of zero, wherein a rising edge of the positive pulse is generated before a start of the idle period of the bit frame, and a falling edge of the positive pulse is generated before an end of the idle period of the bit frame; and generating a positive synchronization pulse in the synchronization signal, wherein a rising edge of the positive synchronization pulse is between the rising edge and the falling edge of the positive pulse in the first data signal or in the second data signal.

5. The IC device of claim 4, wherein a duration of the positive pulse is the same as that of the bit period.

6. The IC device of claim 1, further comprising a third plurality of I/O pins, wherein the digital control circuit is couple to the third plurality of I/O pins and the first plurality of I/O pins.

7. The IC device of claim 6, wherein the IC device is configured to function in a master mode or a slave mode, wherein in the master mode, the IC device is configured to:
receive a standard SPI signal through the first plurality of I/O pins and the third plurality of I/O pins;
convert, by the digital control circuit, the standard SPI signal into the three-pin signal;
send the three-pin signal to the second format converter through the first data bus;
convert, by the second format converter, the three-pin signal into a first Isolated SPI signal; and
output the first Isolated SPI signal at the second plurality of I/O pins.

8. The IC device of claim 7, wherein in the master mode, the IC device is further configured to:
receive, at the second plurality of I/O pins, a second Isolated SPI signal;
decoding, by the second decoding circuit, the second Isolated SPI signal into the three-pin signal;
receive, by the digital control circuit, the three-pin signal through the second data bus;
convert, by the digital control circuit, the three-pin signal into the standard SPI signal; and
output the standard SPI signal at the first plurality of I/O pins and the third plurality of I/O pins.

9. The IC device of claim 8, wherein in the slave mode, the IC device is configured to:
receive a third Isolated SPI signal at the first plurality of I/O pins;
decode, by the first decoding circuit, the third Isolated SPI signal into the three-pin signal;
convert, by the digital control circuit, the three-pin signal into digital bits;
process, by the digital control circuit, the digital bits; and
relay the third isolated SPI signal by outputting the third Isolated SPI signal at the second plurality of I/O pins.

10. The IC device of claim 9, where the digital bits comprises an identification (ID) number, wherein the digital control circuit is configured to process the digital bits by:
comparing the ID number with a device ID of the IC device; and
in response to determining that the ID number matches the device ID of the IC device, sending a frame of data to the first plurality of I/O pins by:
converting the frame of data into the three-pin signal; and
sending the three-pin signal to the first format converter, wherein the first format converter is configured to convert the three-pin signal into a fourth Isolated SPI signal and output the fourth Isolated SPI signal at the first plurality of I/O pins.

11. The IC device of claim 9, wherein in the slave mode, the IC device is further configured to:

receive, at the second plurality of I/O pins, a fifth Isolated SPI signal; and
relay the fifth Isolated SPI signal by outputting the fifth Isolated SPI signal at the first plurality of I/O pins.

12. A battery management system comprising:
a controller;
a master battery management integrated circuit (BMIC) device coupled to the controller and configured to communicate with the controller through a standard Serial Peripheral Interface (SPI) protocol;
a first slave BMIC device, wherein a first Isolated SPI interface of the first slave BMIC device is coupled to an Isolated SPI interface of the master BMIC through galvanic isolation, wherein the first slave BMIC device is configured to be coupled to a first battery pack, wherein the Isolated SPI interface is a two-pin communication interface using a differential signal comprising a positive signal and a complementary negative signal, wherein a bit frame of the positive signal includes a bit period followed by an idle period that has a same duration as the bit period; and
a second slave BMIC device, wherein a first Isolated SPI interface of the second slave BMIC device is coupled to a second Isolated SPI interface of the first slave BMIC device through galvanic isolation, wherein the second slave BMIC device is configured to be coupled to a second battery pack;
wherein the battery management system is configured to:
send, by the controller, a first standard SPI signal to the master BMIC device, the first standard SPI signal comprising a message that includes a request for battery measurement and an identification (ID) number;
convert, by the master BMIC device, the standard SPI signal into a first Isolated SPI signal at the Isolated SPI interface of the master BMIC device;
receive, by the first slave BMIC device, the first Isolated SPI signal through the first Isolated SPI interface of the first slave BMIC device;
relay, by the first slave BMIC device, the first Isolated SPI signal to the second Isolated SPI interface of the first slave BMIC device;
decode, by the first slave BMIC device, the first Isolated SPI signal into digital bits; and
process, by the first slave BMIC device, the digital bits, comprising:
comparing the ID number with a device ID of the first slave BMIC device; and
in response to determining that the ID number matches the device ID, sending measurement data of the first battery pack to the master BMIC device through the first Isolated SPI interface as a second Isolated SPI signal.

13. The battery management system of claim 12, wherein the first Isolated SPI interface of the first slave BMIC device is coupled to the Isolated SPI interface of the master BMIC through a first transformer, wherein the first Isolated SPI interface of the second slave BMIC device is coupled to the second Isolated SPI interface of the first slave BMIC device through a second transformer or through capacitors, wherein the controller and the master BMIC device are disposed on a first printed circuit board (PCB), and the first slave BMIC device is disposed on a second PCB, wherein the first PCB and the second PCB are in different power domains.

14. The battery management system of claim 12, wherein the first battery pack comprises a plurality of battery cells, wherein the measurement data include measurements for the plurality of battery cells, wherein measurements for the plurality of battery cells are packed in a single data frame, wherein the first slave BMIC device is configured to send the single data frame in a burst mode transmission.

15. A battery system comprising:
   a battery pack comprising a plurality of battery cells; and
   a battery management integrated circuit (BMIC) device coupled to the batter pack, the BMIC device comprising:
      a first plurality of input/output (I/O) pins;
      a first interface circuit coupled to the first plurality of I/O pins, wherein the first interface circuit comprises a first decoding circuit and a first format converter;
      a second plurality of I/O pins;
      a second interface circuit coupled to the second plurality of I/O pins, wherein the second interface circuit comprises a second decoding circuit and a second format converter;
      a first data bus coupled between outputs of the first decoding circuit and inputs of the second format converter;
      a second data bus coupled between outputs of the second decoding circuit and inputs of the first format converter;
      a digital control circuit coupled to the first data bus and the second data bus; and
      analog-to-digital converters (ADCs) coupled between the digital control circuit and the battery pack,
      wherein each of the first decoding circuit and the second decoding circuit is configured to decode an Isolated Serial Peripheral Interface (SPI) signal into a three-pin signal, wherein the Isolated SPI signal is a differential signal comprising a positive signal and a complementary negative signal, wherein a bit frame of the positive signal includes a bit period and an idle period that have a same duration, wherein the three-pin signal includes a first data signal, a second data signal, and a synchronization signal, wherein each of the first format converter and the second format converter is configured to convert the three-pin signal into the Isolated SPI signal.

16. The battery system of claim 15, wherein in a bit frame of the positive signal, the idle period follows the bit period, wherein during the bit period, the positive signal transitions from a positive value to a negative value, or vice versa, wherein in the idle period, the positive signal remains at a zero value, wherein the digital control circuit is configured to convert the three-pin signal into digital bits by sampling the first data signal of the three-pin signal at rising edges of the synchronization signal.

17. The battery system of claim 16, wherein for each bit frame of the Isolated SPI signal, each of the first decoding circuit and the second decoding circuit is configured to decode the Isolated SPI signal by:
   generating a positive pulse in the first data signal if the bit frame carries a digital bit of one, or generating a positive pulse in the second data signal if the bit frame carries a digital bit of zero, wherein a rising edge of the positive pulse is generated before a start of the idle period of the bit frame, and a falling edge of the positive pulse is generated before an end of the idle period of the bit frame; and
   generating a positive synchronization pulse in the synchronization signal, wherein a rising edge of the positive synchronization pulse is between the rising edge and the falling edge of the positive pulse in the first data signal or in the second data signal.

18. The battery system of claim 15, wherein the BMIC device is configured to:
   collect, by the digital control circuit, outputs from the ADCs, wherein the outputs from the ADCs comprise measurements for the plurality of battery cells of the battery pack;
   compress, by the digital control circuit, the measurements for the plurality of battery cells into few data bits using a data compression method based on voltage differences among the plurality of battery cells;
   pack, by the digital control circuit, the compressed measurements for the plurality of battery cells in a data frame; and
   send, by the first interface circuit, the data frame in a burst mode of transmission as a first Isolated SPI signal.

19. The battery management system of claim 12, wherein during the bit period of the bit frame, the positive signal transitions between a positive value and a negative value, wherein during the idle period of the bit frame, the positive signal remains at a zero value.

* * * * *